Figure 1:
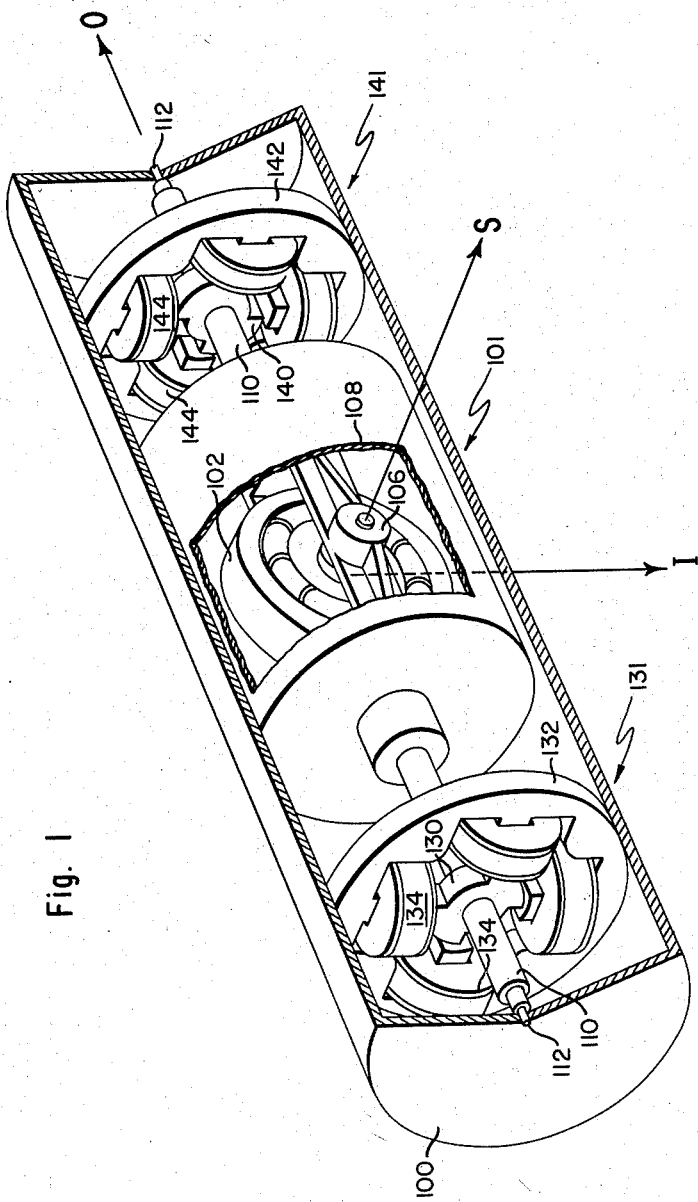

Jan. 13, 1959  R. C. SEAMANS, JR., ET AL  2,868,481
AUTOPILOT
Filed Sept. 5, 1951  4 Sheets-Sheet 1

INVENTORS
ROBERT C. SEAMANS, JR
HENRY P. WHITAKER
FRANK P. WILKINS
SIDNEY A. WINGATE

BY Kenway Jenney Witter & Hildreth
ATTORNEYS

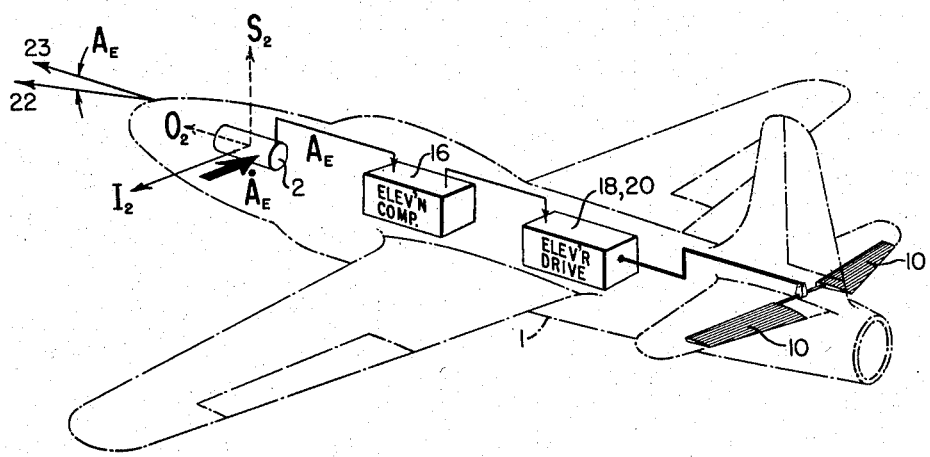
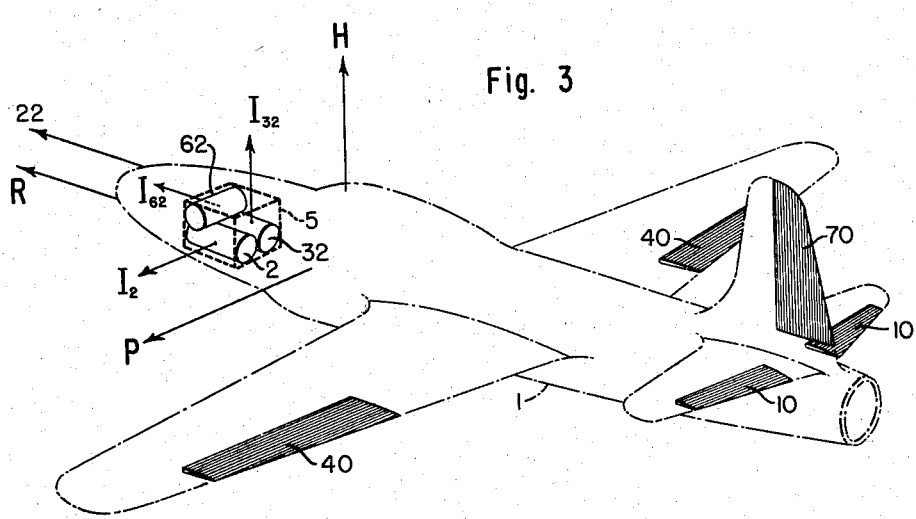

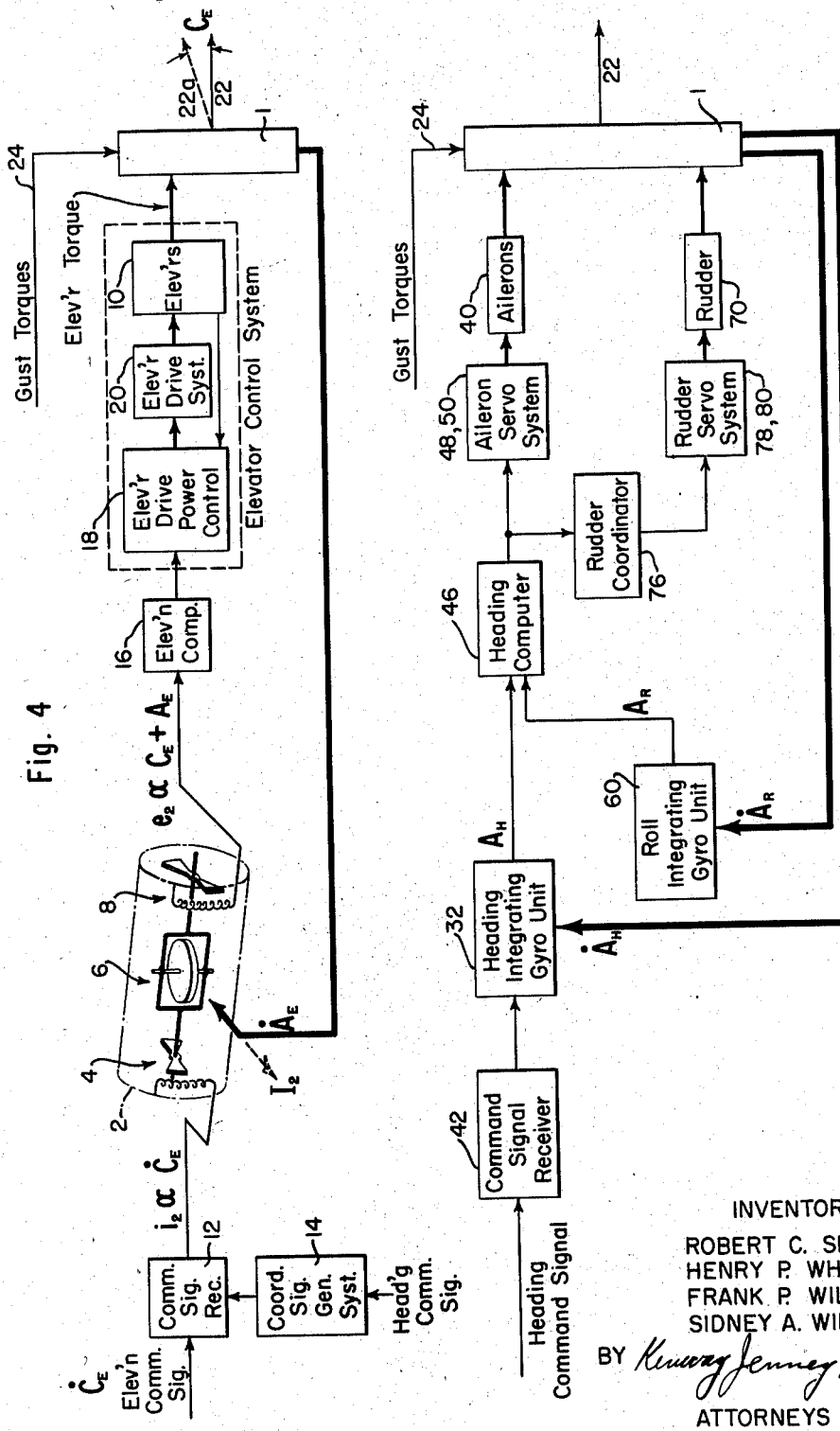

Jan. 13, 1959  R. C. SEAMANS, JR., ET AL  2,868,481
AUTOPILOT
Filed Sept. 5, 1951  4 Sheets-Sheet 4

INVENTORS
ROBERT C. SEAMANS, JR
HENRY P. WHITAKER
FRANK P. WILKINS
SIDNEY A. WINGATE
BY
ATTORNEYS

United States Patent Office 2,868,481
Patented Jan. 13, 1959

2,868,481

AUTOPILOT

Robert C. Seamans, Jr., Beverly Farms, Henry P. Whitaker, Newton, Frank P. Wilkins, Lexington, and Sidney A. Wingate, Cambridge, Mass., assignors, by mesne assignments, to Research Corporation, New York, N. Y., a corporation of New York Application September 5, 1951, Serial No. 245,188

9 Claims. (Cl. 244—77)

The present invention relates to gyroscopic apparatus and more particularly to gyroscopic apparatus for automatically piloting an aircraft.

Hitherto, automatic piloting devices (commonly referred to as autopilots) have generally made use only of two-degree-of-freedom gyroscopes. An autopilot acts to maintain an aircraft on a course line set by the pilot by detecting changes in the orientation of the aircraft from its position when on the set course line. A gyroscope has the property of remaining fixed in space and thus, by pivotally mounting in the aircraft a gyroscope with two degrees of freedom and detecting motion of the gyroscope with respect to its mount, motion of the aircraft off its course can be detected. The detected motion can then be used to activate the control surfaces of the aircraft to return it to its set course.

Such a system has certain disadvantages. A two-degree-of-freedom gyro will drift appreciably from its setting in a relatively short time. The pivotal mounting introduces friction torques which tend to disturb the gyro setting. It is difficult accurately to detect motion of the gyro through such a mounting. Furthermore, such an autopilot will not in general control an aircraft through 360° of maneuver because, at certain angular positions, the gimbals lock.

Occasionally, single-degree-of-freedom gyros have been used in aircraft navigating equipment, but have been generally limited to detecting angular velocities.

It is, therefore, one object of the present invention to provide an autopilot using single-degree-of-freedom gyros which are deflection-sensitive.

It is therefore one object of the present invention to provide an autopilot system with less drift than heretofore possible.

It is another object of the present invention to provide an autopilot system in which gyro deflections can be readily and accurately detected.

It is another object of the present invention to provide an autopilot system in which gyro elements are contained in one gimbal, axially mounted, rather than a plurality of gimbals, thereby providing control through all maneuvers.

In furtherance of the foregoing and other objects as will hereinafter appear, the principal feature of the present invention is the use in an autopilot of single-degree-of-freedom gyroscopes. In a single-degree-of-freedom gyroscope the gyro rotor is supported in a gimbal or frame which rotates in axial bearings about an axis perpendicular to the spin axis. Thus, any motion of the rotor and frame is limited to the axis of the bearings, called the output axis. It is well known that twisting a gyro about one axis causes the gyro to exert a reaction torque about an axis perpendicular to the spin axis and the first axis. This means that the only motion of the single-degree-of-freedom gyro assembly in space which will produce a reaction torque and cause rotation of the rotor and frame about the output axis is motion about an axis perpendicular to the spin and output axes, called the input axis. Since the gyro is sensitive to motion about only one axis, motion of the aircraft can be detected separately about its roll, pitch and yaw axes.

A further feature of the present invention is the use of damping about the output axis of the single-degree-of-freedom gyro to restrain output motions, thus causing the precession deflection to be proportional to the deflection about the input axis, as explained in more detail below and in the copending application No. 216,946 of Draper, Hutzenlaub and Woodbury filed March 22, 1951, now Patent No. 2,752,793, granted July 3, 1956.

Another feature of the present invention is the inclusion of signal generating means about the output axes of the single-degree-of-freedom gyros, thereby converting gyro output shaft deflections relative to the case immediately into electric signals accurately proportional to the gyro deflection. Another feature of the present invention is the inclusion about the output axes of the gyros of torque generators by which the autopilot setting can be readily changed or continuously controlled by another system, such as a guidance system or horizontalizing network.

A further feature of the present invention is the co-ordination of aileron and rudder operation by relatively simple electrical networks as is explained in more detail in the description.

Figure 6:
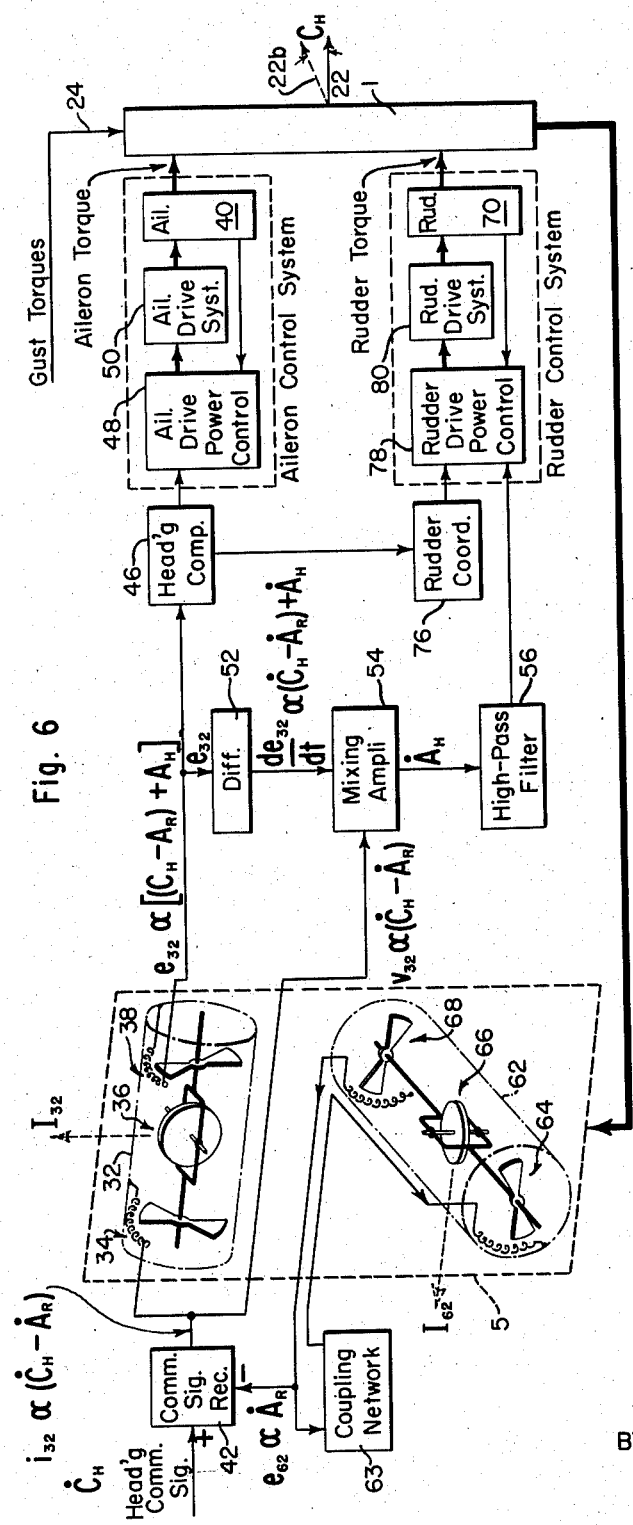
Figure 8:
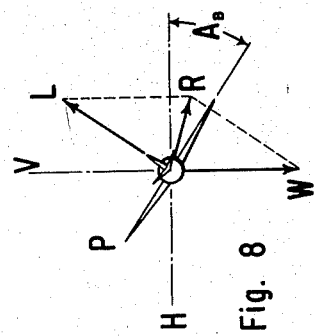
Figure 7:
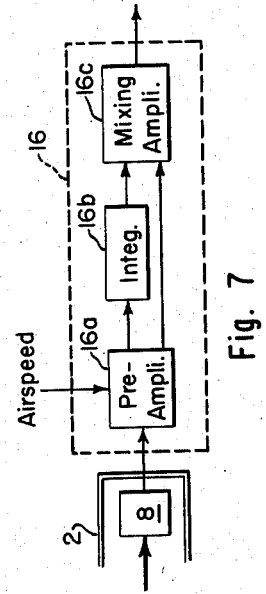

These and additional features will appear from the accompanying drawings which show a preferred embodiment of the present invention: Fig. 1 is a schematic diagram of a preferred embodiment of the single-degree-of-freedom gyroscope; Fig. 2 is a schematic diagram showing the elevation control loop in the aircraft; Fig. 3 is a schematic diagram showing the physical orientation of the gyroscopes in the aircraft; Fig. 4 is a block diagram of the elevation control system; Fig. 5 is a block diagram of a simplified form of roll and heading control system; Fig. 6 is a block diagram of the preferred form of roll and heading control system; Fig. 7 is a block diagram of the elevation computer; Fig. 8 shows the aircraft banked for a turn.

*The integrating gyroscope*

Fig. 1 shows schematically a preferred form of single-degree-of-freedom gyroscope. The assembly is mounted in a case 100 by means of the axial bearings 112. The gyro rotor 102 is mounted, free to spin, in the frame 106 which is attached to the shaft 110 which rotates in the bearings 112. Also mounted on the shaft 110 is a chamber 108 containing the gyro rotor and frame. The chamber is shaped so there is only a small clearance between it and the case. The case is filled with a viscous fluid (not shown) to resist rotations of the chamber and thus to damp deflections of the frame 106 and rotor 102 with respect to the case. Furthermore, the shaft 110 carries a signal generator and torque generator. The signal generator is shown as a rotor 130, with stator 132 and stator windings 134 rigidly attached to the case; the torque generator is likewise shown as a rotor 140, with stator 142 and stator windings 144 rigidly attached to the case. Both units are preferably of the type described in the U. S. Patent No. 2,488,734 of Mueller, issued November 22, 1949. When a reference voltage is applied to the signal generator windings 134, the device produces an output voltage proportional to the deflection of the rotor 130 (and shaft 110) from a neutral position with respect to the stator 132 (and case 100). The torque generator produces a torque proportional to the current input to its windings 144, tending to rotate its rotor 140 (and shaft 110) with respect to its stator 142 (and case 100).

The operation of the single-degree-of-freedom gyroscope will now be explained. The gyro rotor spins about the spin axis S. The rotor will exert reaction torques against its frame 106, but, since the frame is rotatable only in the axis of the bearings 112, the only torque which causes rotation of the gyro elements is a torque about the output axis O. It is well-known that the reaction torque of a gyro is perpendicular to the spin axis and the axis about which the gyro is rotated. Therefore, since the reaction torque of the gyro to cause output rotation is about the axis O, only motion about the input axis I (perpendicular to the spin axis S and output axis O) causes output rotation. This deflection is picked up by the signal generator 131 and converted to an electrical output. Thus, the gyro unit operates in such a way that motion of the case 100 about the input axis I produces an electric output from the signal generator 131.

The purpose and operation of the damping will now be explained. If the case 100 is rotated about the input axis I through an angle $\alpha$, a reaction torque is generated tending to rotate the gyro rotor about its output axis O. The magnitude of this torque is $$H\frac{d\alpha}{dt}$$

where H is the angular momentum of the gyro rotor, and $$\frac{d\alpha}{dt}$$

the angular velocity of motion about the axis I. This output torque is opposed by the damping torque which is $$C\frac{d\theta}{dt}$$

where C is the damping coefficient, $\theta$, the angle through which the shaft 110 moves and $$\frac{d\theta}{dt}$$

the angular velocity of the frame 106 and rotor 102 about the axis O. At equilibrium, these torques balance.

(1) $$H\frac{d\alpha}{dt}=C\frac{d\theta}{dt}$$

The angle $\theta$ can be expressed:

(2) $$\theta=\frac{H}{C}\int\left(\frac{d\alpha}{dt}\right)dt=\frac{H}{C}\alpha$$

$\theta$, the output deflection of the gyro is proportional to the time-integral of the angular velocity or rate about the input axis (which is why this type of gyro is referred to as a "rate-integrating gyro"); $\theta$ and the output of the signal generator 131 are therefore proportional to $\alpha$. The output of the gyro unit is proportional to its angular deflection about the input axis I.

The damping also operates to produce integration of the torque applied by means of the torque generator 141. If a torque $T_g$ is applied through the torque generator, it is resisted by the damping torque $$C\frac{d\theta}{dt}$$

and the gyro element achieves constant velocity when (3) $$\frac{d\theta}{dt}=\frac{T_g}{C}$$

Therefore, (4) $$\theta=\frac{1}{C}\int T_g dt$$

The gyro output deflection $\theta$ (and therefore the signal output of the unit) is proportional to the time-integral of the torque imposed by the torque generator; since in the preferred form of torque generator this torque is proportional to the current input to the torque generator, the gyro unit output is proportional to the time-integral of the gyro unit current input.

The above description has shown how the preferred gyro unit shown in Fig. 1 is rate-integrating. Such a gyro unit can also be made rate-sensitive, that is, the deflection $\theta$ is made proportional to the angular velocity $$\frac{d\alpha}{dt}$$

about the input axis, rather than the angular deflection $\alpha$. In order to do this, means are provided to resist rotations of the shaft 110 by a torque $K\theta$ proportional to the shaft deflection $\theta$. The gyro element comes to rest when its reaction torque.

$$H\frac{d\alpha}{dt}$$

(where H is the angular momentum of the rotor 102) equals the resisting torque $K\theta$. In such a case, (5) $$\theta=\frac{H}{K}\left(\frac{d\alpha}{dt}\right)$$

The output deflection of the frame 106 and rotor 102 and the output signal from the signal generator 131 are proportional to the angular velocity of the gyro unit as a whole about the input axis I.

Means for producing such a $K\theta$ resisting torque may be a spring active between the shaft 110 and case 100 or a "stiffness" generator as described in the above-mentioned Mueller patent. However, for the preferred form of gyro unit shown in Fig. 1, a particularly convenient method is to provide a coupling network to adapt the signal generator output to act as the torque generator input. Since the signal generator output is proportional to the shaft deflection $\theta$ and the generated torque is proportional to the current input to the torque generator, if the coupling network makes the torque generator input proportional to the output of the signal generator, a resisting torque is produced proportional to the deflection of the frame 106 and rotor 102.

A more complete description of the means for making the gyro unit of Fig. 1 velocity-sensitive, will be found in the copending application of Draper, No. 239,978 filed August 2, 1951, now Patent No. 2,752,790, granted July 3, 1956. A more complete description of the construction and operation of the gyro unit of Fig. 1 will be found in the copending application No. 210,246, filed February 9, 1951 of Jarosh, Haskell and Dunnell, now Patent No. 2,752,791, granted July 3, 1956.

Principles of operation

Fig. 2 shows schematically the basic servo loop which is made use of in the present invention. An airplane is shown at 1. Rigidly mounted in the plane is a single-degree-of-freedom gyro 2 of the sort shown in Fig. 1. Its spin, output and input axes are shown at $S_2$, $O_2$ and $I_2$ respectively, to indicate the orientation of the gyro.

In the diagram, rigid mechanical connections are shown by heavy arrows; power-lever connections are shown by medium lines and signal-lever connections by light lines. The aircraft 1 is shown as flying along a line 23, having deviated in elevation from its desired position along line 22, by an angle $A_E$.

The gyroscope 2 by virtue of its rigid mounting to the aircraft and its orientation, its output axis $I_2$ being parallel to the pitch axis of the aircraft, detects the angular velocity $A_E$ of this deviation. It deflects in its case to produce an output signal proportional to $A_E$, the amount of input rotation, as explained above.

This signal is used to activate control surfaces (the elevators 10) of the aircraft to move the aircraft until this error $A_E$ is nulled and the aircraft is travelling again in the desired position, along line 22.

The signal is passed initially to a control computer 16 which calculates the angle at which the elevators 10 should be set to nullify the deflection $A_E$. The computer generates an output of magnitude sufficient to cause the servo system 18, 20 to set the elevators 10 at the proper angle. The elevators cause the aircraft to nose down at a certain angular velocity about the pitch axis; this correction angular velocity sets up a torque in the gyro tending to rotate the gyro element back to its null position. When the gyro element is rotated back and its deflection nulled, its output signal is zeroed, the servo system 18, 20 is no longer active and the elevators 10 return to their normal position. Since the gyro is sensitive to deflections, it is nulled only if the deflection from the line 22 is completely corrected for; so long as any deflection is left, the gyro remains deflected and the correcting servo loop is still in action.

In Fig. 3, the arrangement of all three gyros is shown in the aircraft 1. The gyros are conveniently contained in one mounting 5. Three gyros are provided to form a set of three orthogonal axes about which all motion of the aircraft is detected. All the control surfaces of the aircraft, the ailerons 40, the elevators 10 and the rudder 70, are activated by the gyros.

The pitch or elevation gyro 2 is oriented so its input axis $I_2$ is parallel to the pitch axis P of the aircraft. Similarly the yaw or heading gyro 32 is so placed that its input axis $I_{32}$ is parallel to the yaw axis H of the aircraft and the roll gyro 62 so that its input axis $I_{62}$ is parallel to the roll axis R of the aircraft. Each gyro is the detecting element in a control loop like that shown in Fig. 2 so that all control surfaces of the aircraft are actuated to maintain it in its proper orientation along the controlled line 22 against deviations in roll, pitch or yaw. Furthermore, each gyro may be controlled (as shown below) in order to maneuver the aircraft through the autopilot itself. This may be done momentarily, as by the pilot, or continuously as by a fire-control or guidance system. This represents a considerable improvement over existing autopilots in which the pilot must cage the gyros, maneuver the plane and then uncage them for the autopilot to stabilize about a new course.

*Elevation stabilization*

In Figs. 2 and 3, where the arrangement of the elevation gyroscope of the present invention in an aircraft is shown, the position of the elevation or pitch gyro unit 2 can be seen. The gyro unit is so mounted in the aircraft that its input axis is parallel to the pitch axis of the aircraft. Thus, the gyro deflects an angle proportional to the angle the aircraft pitches, or the time-integral of the angular velocity of the aircraft about its pitch axis.

Fig. 4 is a block diagram of the elevator or pitch control subsystem of the autopilot. Connections are indicated by arrows; broad arrows show rigid or semi-rigid mechanical connections, medium arrows, power-level mechanical or electrical connections, and light arrows, signal level electrical connections. Because single-degree-of-freedom gyros are used, sensitive to input motion about only one axis, there is no coupling between the elevator control system (pitch) and the aileron and rudder control systems (roll and yaw), except when a turn is made, as will be explained below.

In Fig. 4, the elevator gyro unit is shown at 2 with its three component parts, the torque generator 4, the gyro element 6, and the signal generator 8 (corresponding to the components 141, 101 and 131 respectively, of Fig. 1). The aircraft is shown at 1 and its elevators at 10. The remaining parts are servomechanical or electrical components which will be described in the course of the explanation of the elevator control system.

The aircraft 1 is subject to two inputs about its pitch axis, the torque due to its elevators 10 and gust torques shown by the arrow 24 tending to move it from its desired position as indicated by the controlled line 22. Both these will move the aircraft, thereby giving it an angular velocity denoted $A_E$ or $pA_E$, where $p$ is the differential operator $$\frac{d}{dt}$$

and $A_E$ is the angular deviation of the aircraft about its pitch axis from the controlled line 22. This angular velocity is transmitted directly to the gyro unit because the gyro unit is mounted in the aircraft. This connection is indicated by the broad arrow from the aircraft 1 to the case 5 and gyro unit 2.

As was explained above, this angular velocity of the gyro base about the gyro input axis causes the gyro to deflect in its mounting an angle proportional to the time-integral of this velocity or proportional to the total deflection. The deflection of the gyro element 6 will cause the signal generator 8 to produce a voltage proportional to the gyro deflection (because its rotor is rigidly coupled to the gyro frame as indicated by the shaft linking the gyro element 6 and signal generator). Thus, the voltage output $e_2$ of the elevator gyro unit is proportional to $A_E$, the deflection of the aircraft from its stabilized position.

This voltage is acted upon by the elevation computer 16 and, by means of the elevator control system 18 and 20, orients the elevator 10 to a position in which the aircraft 1 is given an angular velocity to cancel out any changes in aircraft orientation.

The purpose of the elevation computer 16 will now be explained. It is desired to have output signals from the elevation gyro 2 activate the elevator control system (18, 20 and 10). Their power level must be raised, and therefore the computer includes an amplifier. However, at high airspeeds it is not necessary to have the elevators 10 deflected so much as at low airspeeds. Therefore it is desirable to have the gain of the amplifier varied by the airspeed. This can be done by well-known means; a voltage representing air speed may be obtained from the airspeed meter or associated components and used to bias a vacuum tube or to vary the speed of a generator amplifier. Thus, as shown in Fig. 7, the signal from the signal generator 8 is passed to a pre-amplifier 16a whose gain is varied by the airspeed.

The elevation computer serves another purpose. Generally, as an aircraft flies over a long period, trimmings, or small, continuous changes in the position of the control surfaces, are needed to correct for unbalances, such as the emptying of fuel tanks, or slow changes in airspeed.

In order to move the elevators very slightly but continuously, a small but permanent deflection of the gyro element 6 would be necessary to provide an activating signal for the control system (18, 20 and 10). This is undesirable, since it makes the gyro setting on the controlled line 22 inaccurate. Therefore, the computer 16 includes an integrator to remedy this defect. By means of the integrator a long-period signal is provided for the elevator control system (18, 20 and 10) without any substantial long-period deflection of the gyro element 6. A very small persistent gyro deflection causes an increasing integrator output to perform long continuous trimming, according to well-known principles of integral control.

It is neither necessary nor desirable to integrate all of the signal from the signal generator 8, and so, as shown in Fig. 7, the integrator 16b is by-passed by a direct channel from the preamplifier 16a to the mixing amplifier 16c where the integrated and non-integrated signals are combined.

The elevator control system is a section of the network that will vary, depending on the aircraft in which the autopilot is to operate. The system shown in Fig. 4 is a common one. The elevator drive power control system 18 is a torque motor, acting through wires and gears denoted by the elevator drive system 20, to move the elevator 10 itself. The elevator 10 in general will be equipped with a servo detector of its angular position which generates an elevator position signal which is fed back to the elevator power system 18. In this way an internal closed-loop system is formed in which the feedback of position information causes the angular deflection of the elevator 10 from its neutral position to be proportional to the signal input to the elevation control system.

An alternative form of elevator control system is a hydraulic system. In such a case, the drive power control unit 18 would be an electric valve activating a hydraulic drive system 20 to move the elevators 10; servo feedback of elevator position would be provided by the signal generator on the elevators. The elevator control system is not explained in more detail here since the various types found in airplanes are well known to those skilled in the art and form no part of the present invention.

Elevation commands

The autopilot of the present invention must serve two functions: it must not only stabilize about a set course but also be adapted to receive changes in the setting of the course. This is conveniently done in the present invention by means of the torque generator 4 acting about the output axis of the gyro 2. Preferably this torque generator (see Fig. 1) generates a torque tending to rotate the shaft 110 of the gyro unit with respect to its case which is proportional to the current input to the windings on the stator 142 of the torque generator. As was explained in connection with Fig. 1, this torque is time-integrated by the damper 108 so the signal generator associated with the gyro delivers an output proportional to the time-integral of the input current to the torque generator. This input current $i_2$ is made proportional to $C_E$, the commanded angular velocity of elevation change.

The output from the signal generator $e_2$, just as if it were an output caused by a velocity of error in course ($\dot{A}_E$) detected by the gyro 2, causes the remainder of the system to move the aircraft. This aircraft angular velocity is detected by the gyro which generates a countertorque. These torques balance, producing zero rate of change in gyro deflection when the aircraft angular velocity bears a given proportionality to the torque imposed on the gyro, this torque being proportional to the input current.

Thus, while the input current is applied, the aircraft noses up from its former position with a commanded angular velocity $\dot{C}_E$ proportional to the current; the gyro element is deflected to produce the signal necessary for this angular velocity. When the input current is removed, this angular velocity of the aircraft persists, generating a reaction torque in the gyro element tending to rotate it to its undeflected position in its case. When it reaches that position, the signal output ceases and the elevators are returned to their neutral position and the aircraft flies along a new controlled line with no angular velocity away from it. This new controlled line differs from the old one by an angle $C_E$ which is the time-integral of the angular velocity the aircraft was given by the input current. Since this angular velocity was proportional to the current input, the aircraft has been moved through an angle proportional to the time-integral of the input current. In other words, to reach the new equilibrium point, the aircraft has moved through an angle $C_E$ proportional to the time-integral of the commanded angular velocity of heading change, $\dot{C}_E$. The aircraft is now stabilized about this new position, and it will be noted that the system also stabilizes during the application of the command signal.

Therefore, to alter the setting of the aircraft, it is necessary only to impose on the torque generator a signal which is proportional to the desired angular velocity of the change in aircraft setting. This signal is shown in Fig. 4 as the elevation command signal $\dot{C}_E$. The elevation command signal receiver 12 is an amplifier or other similar means to adjust the command signal to the input range of the torque generator 4.

The command signal receiver 12 also serves to receive coordination signals from the coordination signal generating system 14 which is activated by the heading control system. The unit 14 activates the elevation control system to produce an increase in lift when the aircraft is banked for a turn.

Most of the lift force on an aircraft acts normally to the wings; the weight force is always vertical. When the wings are horizontal, the lift force just balances the weight force. As shown in Fig. 8, if the aircraft banks for a turn through an angle $A_B$, only a component of the lift force L acts in the vertical plane V to balance the weight force W. The resultant force R is downward and the airplane will lose altitude unless the lift force L is increased. In order to increase the lift force it is convenient to increase the angle of attack of the wing, which is done by nosing the aircraft up.

Thus, when the aircraft is banked, it is necessary to increase the angle of the elevators. This means that a heading command signal must actuate the elevation control loop. This is done by means of the coordination signal generating system 14 (Fig. 4). The calibration of angle of bank to change in angle of attack will be fixed for a given type of aircraft and therefore the configuration of the signal generating system 14 may be fixed.

Roll and heading

Fig. 5 shows a simplified section of an autopilot for dealing with roll and heading control, using two integrating gyros. It consists of two loops each like that shown in Fig. 2 or Fig. 4 for controlling elevation, but with the gyros oriented as shown in Fig. 3 to correct for roll and heading. The two loops are each associated with a gyro unit, one gyro for heading and one gyro for roll. Each of these loops operates both the rudder and the ailerons. This interrelation arises because both the ailerons and rudder are needed to move the airplane about its heading axis and both are needed to move the airplane about its roll axis. It is to be understood that the roll loop is an internal loop in the heading control loop because the aircraft's velocity about its roll axis and its velocity around its heading axis are interrelated.

To facilitate the explanation, various phases of the heading and roll operation will be separated in the discussion. First, it will be shown how the rudder is coordinated with the ailerons. Second, it will be shown how roll stabilization is effected and how the roll integrating gyro of Fig. 5 is replaced by a rate gyro. Third, it will be shown how heading stabilization and commands are effected. Fourth, the action of the roll gyro in the presence of a heading command will be described. It should be noted that there will be no roll commands; a heading command, however, will establish a desired angle of bank.

The orientation of the heading and roll gyros can be seen in Fig. 3. The input axis $I_{32}$ of the heading gyro 32 is normally parallel to the heading axis of the aircraft which is normal to the wings. The input axis $I_{62}$ of the roll gyro 62 is parallel to the roll axis which runs lengthwise down the aircraft.

Coordination of the rudder

To move the aircraft about its heading axis, both ailerons and rudder are needed. As shown in Fig. 5, the output of the heading computer 46 will determine the angle at which the ailerons are set. It will now be shown how the rudder is operated in coordination with the ailerons, that is, how an output is obtained for the rudder coordinator 76 to set the rudder at the angle proper to the aileron position. If the aircraft were turned by the ailerons alone, in general, there would be a tendency to sideslip. Therefore, it is necessary to move the rudder an amount dependent on the aileron deflection.

In the present invention, the rudder is operated with the ailerons. This is a radical departure from existing autopilot systems, for it has been customary to try and separate the rudder and aileron systems. In the present invention, means are provided for coordinating the rudder and aileron, which in general consist of relatively simple electronic circuits in the rudder coordinator 76 (see Figs. 5 and 6).

A signal from the yaw computer 46 is imposed on the coordinator 76 which is proportional to the angular position of the ailerons. The purpose of the coordinator 76 is to perform mathematical operations on that signal so that the signal output of the computer 76 will produce the rudder angle for zero sideslip with that angular position of the ailerons. The exact relation could be obtained from a computer but we have provided a simpler means which produces an accurate approximation.

The aileron-angle-to-rudder-angle relation will vary from type of aircraft to type of aircraft, but not appreciably between individual airplanes of the same type. Therefore, the coordination computer can be fixed empirically for a particular type of plane. The technique is as follows. An airplane of the given type is flown with its rudder locked, and only its ailerons permitted to move. These are given a sinusoidal motion of frequency $\omega$, so that the aileron angle $\delta_A$ is $\delta_{AO} \sin \omega t$. $\beta_A$, the sideslip when only the ailerons are operated, is measured. It will be a sinusoidal motion of amplitude $\beta_{AO}$ differing in phase from the aileron motion by an angle $\phi_A$.

(6) $\qquad \beta_A = \beta_{AO} \sin (\omega t + \phi_A)$

A graph is then made of the ratio $$\frac{\beta_{AO}}{\delta_{AO}}$$

as a function of $\omega$, and a similar graph for the phase angle $\phi_A$ between $\beta_A$ and $\delta_A$. The airplane is then flown with the ailerons locked and only the rudder operative; the rudder is given a sinusoidal motion like that of the ailerons and $$\frac{\beta_{RO}}{\delta_{RO}}$$

(amplitude of rudder sideslip divided by amplitude of rudder angle) and $\phi_R$ (phase angle between $\beta_R$ and $\delta_R$) are plotted as functions of $\omega$ (the oscillation frequency of the rudder).

The desired condition is zero magnitude of sideslip. This may be written:

(7) $\qquad \left[\dfrac{\beta_A}{\delta_A}\right]\omega\delta_A + \left[\dfrac{\beta_R}{\delta_R}\right]\omega\delta_R = 0$ or (8) $\qquad \dfrac{\delta_R}{\delta_A} = \dfrac{[\beta_{AO}/\delta_{AO}]\omega \sin (\omega t + \phi_A)}{[\beta_{RO}/\delta_{RO}]\omega \sin (\omega t + \phi_R)}$ The numerator and denominator amplitudes of the right-hand side of the equation are the two amplitude graphs experimentally plotted. Therefore the function which represents the desired rudder-to-aileron amplitude ratio for zero-amplitude sideslip as a function of frequency is the function resulting from dividing one amplitude graph by the other by conventional means. Similarly, $$\psi_{AR} = (\phi_A - \phi_R)\omega$$

the phase angle $\psi_{AR}$ between rudder-and-aileron (for the zero sideslip condition) is the function obtained from subtracting the rudder phase angle $\phi_R$ graph from the aileron phase angle $\phi_A$ graph.

A function is thus obtained which is the ratio of rudder amplitude to aileron amplitude as a function of frequency with a phase angle between rudder and aileron which is also a function of frequency. This function therefore describes an electric filter. The problem of constructing a rudder coordinator reduces to the well known problem of constructing an electric filter to approximate the function obtained above; this may be done by a number of conventional techniques.

A signal proportional to the aileron deflection is obtained from the deflection signal modifier 46 and passed through the rudder coordinator 76 to obtain an output signal to activate the components which move the rudder. This output signal is proportional to the desired rudder angle. As an example of the coordination computer 76, for a B–26 bomber it consists of a simple R–C low-pass filter with amplifiers to correct proportionalities.

The components which move the rudder will vary from aircraft to aircraft and are well-known. They are not part of the present invention and will not be described in detail.

*Roll stabilization*

In the simplified autopilot of Fig. 5, an integrating gyro 60 of the type shown in Fig. 1 was used for detecting motion of the aircraft about the roll axis. In such a case, the roll gyro loop would operate in the same way as the elevation gyro loop except that no commands are applied to the torque generator of the roll gyro. That is, the aircraft 1 is flying along a controlled line 22, parallel to the longitudinal axis of the aircraft. The aircraft 1 is subject to gust torques 24 which may cause it to roll from its initial position about the roll axis. The roll angular velocity $\dot{A}_R$ is transmitted to the roll gyro unit 60. This gyro unit, being an integrating gyro, deflects an amount proportional to the time integral of this input angular velocity; it deflects an amount proportional to $A_R$, and generates an output signal proportional to $A_R$.

This output signal is passed to the heading computer 46 (like the elevation computer 16) to set the ailerons at an angle to null the roll deviation $A_R$. The output from the computer 46 activates the aileron servo systems 48 and 50 and the ailerons 40. This output also is passed to the rudder coordinator 76 to set the rudder at an angle with respect to the ailerons such that there is no sideslip. The coordinator 76 activates the rudder servo system 78, 80 and the rudder 70. The rudder and ailerons together move the aircraft back through $A_R$ so that it is returned to its control position about the roll axis.

However, the use of an integrating gyro in this application involves two disadvantages. First, in an integrating gyro the null position in space is set by the initial position of the gyro. It is motion of the gyro (and aircraft) away from that position which causes gyro deflection. In the case of elevation stabilization it is desired to keep the aircraft oriented in its initial position and thus the gyros are uncaged when the aircraft is oriented as desired. In roll stabilization, however, it is desired only to keep the aircraft flying accurately level and it is hard to tell if the aircraft is precisely level so as to know when to uncage the roll gyro, unless the gyro itself is used.

Secondly, the integrating gyro has an accurate range of only about four or five degrees away from its null position. In a given heading command calling for bank, as much as forty or fifty degrees of aircraft roll may be called for and the roll gyro, if it is an integrating gyro, has to deflect over this range and remain deflected so as to unbank the aircraft when the turn is completed. It could not, as in pitch or yaw, be continuously nulled as the aircraft assumed new positions of its controlled line 22.

Both these difficulties are solved by the use of a rate gyro plus an integrator for roll control. As was explained above, a rate single-degree-of-freedom gyro is one in which the gyro deflections are opposed by a spring member and the gyro deflection is proportional to angular velocity.

The use of a rate gyro solves the first difficulty, because, since the gyro is sensitive only to velocities, there is no null position in space. The gyro is nulled if the aircraft is not rolling, even if the aircraft is banked. When not turning, the condition of level flight is obtained because any other position will cause the aircraft to turn about its heading axis, bringing the heading stabilization system into play to level the aircraft.

The second difficulty is solved by the use of a rate gyro and an integrator. The gyro need never deflect more than a few degrees for any roll maneuver of the aircraft, no matter how large. When the aircraft goes into a bank, the rate gyro deflects as long as there is an angular velocity, as long as the aircraft is moving towards the desired angle of bank. When the aircraft reaches the angle of bank and stops rotating about its roll axis, the rate gyro is undeflected. Then, when the aircraft returns to level flight, the rate gyro deflects in the opposite direction and nulls when the aircraft stops rolling. The integrator, meanwhile, produces an output signal which increases as the aircraft rises to the desired angle of bank, is fixed during the turn and decreases as the airplane returns to level flight. Thus, an error signal is produced which is at all times proportional to the angle by which the aircraft is deflected from level flight (just as the roll integrating gyro 60 of Fig. 5 would produce); but it is only necessary for the gyro unit itself to deflect proportional to the angular velocity.

It is convenient to use for the integrator the yaw integrating gyro unit 32. (The integrating action of a damped single-degree-of-freedom gyro was explained in connection with Fig. 1.) Fig. 6 shows how these changes are made for the autopilot of Fig. 5. The output from the roll rate gyro 62 is passed to the torque generator 34 of the yaw gyro 32. A signal $A_R$, which is the integral of the input signal which was proportional to the angular velocity of roll $\dot{A}_R$, is read out of the signal generator 38. This signal is proportional to $A_R$, the angular deviation about the roll axis. The heading computer 46 determines from $A_R$ the proper aileron angle and the rudder coordinator 76 adds rudder operation so there is no sideslip.

It should be noted the heading computer 46 is of the same form as the elevation computer 16 of Fig. 4. That is, it varies with aileron angle with the airspeed and provides integration for trimming.

It is convenient to use uniform components throughout and for that, and other reasons, the roll rate gyro 62 is made from an integrating gyro of the type shown in Fig. 1, by a coupling network, as was explained in connection with that drawing. As shown in Fig. 6, the output of the signal generator 68 is connected back through the coupling network 63 to act as the input to the torque generator 64. The signal generator output is proportional to the deflection; the torque is proportional to the electrical input. Thus, a resisting torque is produced that is proportional to the deflection, which is the characteristic of a spring. This arrangement is described in more detail in the above mentioned Draper Patent No. 2,752,790.

Heading control

Referring to Fig. 5, it will be seen that the simplified form of autopilot there shown consists of two loops like the one shown in Fig. 2 or Fig. 4 for operation of the ailerons and rudder. One loop is associated with the heading gyro and one with the roll gyro. Both use the rudder and ailerons for closing the loop.

As was explained above, certain changes are made in the roll loop, but, as can be seen from the final design of Fig. 6, the heading loop operates in the same way as the elevation control loop.

Figs. 5 and 6 which show the heading loop may be compared with Fig. 4 showing the elevation control loop. Gust torques 24 deflect the airplane from its position on the controlled line 22. The yaw integrating gyro 32 (like the elevation gyro 2) is sensitive to airplane deflections about its input axis and produces a signal output proportional to such aircraft deflections. This signal is passed to a heading computer 46, which is a network like the elevation computer 16, shown in detail in Fig. 7. Amplification is provided to raise the power level in order to operate the aileron servo system. The gain is varied as a function of airspeed. A stage of integration is provided to trim the aircraft. The rudder coordinator 76 determines the rudder angle for zero sideslip.

The computer and coordinator activate the aileron and rudder servo systems comprising (see Fig. 6) the drive power systems 48 and 78, the drive systems 50 and 80, the ailerons 40 and the rudder 70. As explained above, such servo systems are well-known to those skilled in the art and form no part of the present invention.

The ailerons and rudder are deflected, causing the aircraft to turn about its yaw axis, until the gyro 32 is returned to its undeflected position and the gyro unit output signal is nulled. The roll gyro 62 behaves as described above.

The heading system is activated by command signals in the same fashion that the elevation control system was. The command signals provide an input to the torque generator 34, deflecting the gyro, activating the aileron servo systems 48 and 50, and the ailerons 40 to move the aircraft through an angle proportional to the time-integral of the command signal.

Heading commands and the roll gyro

The operation of the roll gyro in the presence of a heading command should be noted. Heading commands appear as input currents to the torque generator 34 of the yaw gyro unit 32 and are proportional to $\dot{C}_H$, the desired angular velocity of heading change. Aerodynamically, a given velocity of yaw corresponds to a certain roll or bank angle. Therefore, the signal is also a command for a certain angle of roll. The heading command signal activates the torque generator 34, deflecting the gyro element 36 and producing an output signal from the gyro unit which is proportional to the integral of the input, that is, $C_H$, the commanded deflection of heading. This signal deflects the ailerons, and by means of the rudder coordinator 76, the rudder.

As soon as the rudder and ailerons are deflected, the aircraft begins to roll and to yaw and the two gyro units begin to pick up angular velocities of deflections. The roll rate gyro unit 62 produces a signal proportional to $\dot{A}_R$, the angular velocity of roll; the heading gyro unit 32 produces a torque on its gyro element proportional to $\dot{A}_H$, the angular velocity of heading change and an output proportional to $A_H$, the displacement of the heading of the aircraft. Considering torques on the gyro element 36, the command signal is activating the torque generator 34 and deflecting the gyro element 36; the roll gyro and the heading gyro are resisting this deflection, the former by the torque generator 34 and the latter by a torque originating in the gyro element 36. The three torques are proportional respectively to $\dot{C}_H$, $\dot{A}_R$ and $\dot{A}_H$. At this point, the aircraft is banking towards its proper bank angle.

When it reaches that angle, the three torques balance: $\dot{A}_H$ equals $\dot{C}_H$ and $\dot{A}_R$ is zero. The aircraft is turning steadily about its yaw axis at the commanded rate; it has reached the proper bank angle and there is therefore no angular velocity of roll.

The sum of the torques on the gyro element 36 is zero so it no longer moves; the resisting torques have returned the gyro to its null position so the ailerons are also undeflected. If the aircraft had exceeded its proper bank angle, it would have been turning too fast about its yaw axis, the torque due to $\dot{A}_H$ would have been greater than that due to $\dot{C}_H$ and the gyro element 36 would be deflected back past its null position, reversing the ailerons to bring the aircraft back to its proper bank angle.

The stabilization process goes on during all this. The effect of the gust torques 24 is simply to superimpose aircraft deflection torques on the gyro elements in addition to the torques involved in the command process.

When the aircraft has moved through $C_H$, the desired change in heading, the command signal is removed. The $\dot{A}_H$ torque on the gyro element 36 deflects it, activating the ailerons to unbank the airplane. As the aircraft unbanks, a roll velocity, $\dot{A}_R$, torque is generated. When it returns to level flight the two signals are nulled and the aircraft 1 is in equilibrium about a new controlled line 22b, displaced from the old one by $C_H$, the time-integral of the command signal $C_H$, just as in the case of an elevation command signal.

Damping of Dutch roll

An airplane has a short-period oscillatory mode about its yaw axis, so that, if uncorrected, it would travel along an S-shaped path around its course, like a Dutchman skating down a frozen canal. The motion involves both a yaw and roll oscillation.

Ideally the heading motion could be damped by providing a large tail surface on the aircraft. But such a tail surface would create a condition of spiral instability, that is, in banking for a turn, wind against the tail would tend to push the tail up and the nose down so the aircraft would spiral downward.

In the present invention the damping effect of a large tail surface is obtained by moving the rudder in phase with the velocity of this motion. The components 52, 54 and 56 of Fig. 6 are used for this purpose.

The mixing amplifier 54 receives an input signal $v_{32}$, from the input to the gyro unit 32. $V_{32}$ is the input to the torque generator 34, causing the output signal $e_{32}$ of the gyro 32 to include a component proportional to $\int v_{32} dt$ and a component proportional to the integral of the heading angular velocity of the aircraft, $\dot{A}_H$. The signal $e_{32}$ is passed through a differentiator 52, so that the resulting signal $$\frac{de_{32}}{dt}$$

is proportional to $v_{32}$ plus the heading angular velocity $\dot{A}_H$. The mixing amplifier 54 subtracts its two inputs so that the output of the amplifier 54 is proportional simply to the velocity of heading change.

This yaw velocity $\dot{A}_H$ will in general contain two components: a long-period yaw which is a result of a commanded turn and a short-period Dutch roll yaw. The rudder is already being operated in conjunction with the ailerons by means of the rudder coordinator 76 for the long-period turn. Therefore the signal from the amplifier 54 is passed through a high-pass filter which substantially eliminates the long-period component. The rudder control system is then activated by a signal proportional to the angular velocity of Dutch roll, to move the rudder an angle proportional to this input signal. This produces a rudder torque proportional to velocity of yaw, thus damping out the oscillation.

It will thus be seen that the present invention provides an autopilot using only single-degree-of-freedom gyros, which detect deviations of the aircraft from a set course and activate the control surfaces of the aircraft to keep it on course.

Furthermore, torque generating means are provided to maneuver the aircraft through the autopilot and to change the course setting without caging the gyros. Finally, the aileron and rudder systems are coordinated rather than separated.

Having thus described our invention, we claim:

1. In an automatic piloting apparatus for an aircraft with control surfaces and servo means for moving the control surfaces, a single-degree-of-freedom gyroscope rigidly mounted in the aircraft whereby motion of the aircraft about one of its principal axes causes output rotation of the gyro, means for resisting output rotation of the gyro by a torque dependent only on the rate of gyro output rotation, signal generating means to produce an electric signal output dependent on the amount of output rotation, and connections to activate the servo means responsive to the output signal to move the control surfaces of the aircraft to move the aircraft to null the gyro rotation and output signal, said connections including signal-integrating means.

2. Apparatus as claimed in claim 1 in which said signal-integrating means has a non-integrating channel in parallel with it and means for combining the integrated and non-integrated signals and adapting them to activate the servo means.

3. In an automatic piloting apparatus for an aircraft with control surfaces and servo means for moving the control surfaces, a plurality of single-degree-of-freedom gyroscopes rigidly mounted in the aircraft whereby motion of the aircraft about its principal axes causes output rotations of the gyros, a plurality of means causing output rotations of the gyros to be resisted only by torques dependent on their respective rates of output rotation, whereby the output deflection of the gyros is proportional to the deflection of the aircraft about its principal axes, a plurality of signal generating means which produce electric signal outputs, each dependent on the amount of output rotation of one gyro, and connections for each signal output to activate the servo means to move the control surfaces of the aircraft to move the aircraft to a position in which the gyro rotations and output signals are nulled, said connections including signal-integrating means.

4. Apparatus as claimed in claim 3 in which said signal-integrating means has a non-integrating channel in parallel with it and means for combining the integrated and non-integrated signals and adapting them to activate the servo means.

5. Apparatus as claimed in claim 3 in which said connections include amplifiers with two outputs whose gain is a function of the airspeed of the aircraft, means for integrating one output and means for combining the integrated and unintegrated outputs.

6. In an automatic piloting apparatus for an aircraft with control surfaces and servo means for moving the control surface, three single-degree-of-freedom gyroscopes rigidly mounted in the aircraft so that their input axes are parallel to the elevation, heading and roll axes of the aircraft, means for causing output rotations of the elevation and heading gyros to be resisted only by torques proportional to their respective rates of output rotation, whereby the output deflection of the gyros is proportional to the deflection of the aircraft about its elevation and heading axes, means for causing output rotations of the roll gyro to be resisted only by a torque proportional to its amount of output rotation, three signal generating means which produce electric signal outputs, each dependent on the amount of output rotation of one gyro, means adapting the signal outputs of the gyros to move the control surfaces of the aircraft to move the aircraft to a position where the gyro rotations are nulled, and torque generating means responsive to electric inputs operative about the output axes of the heading and elevation gyros to produce torques tending to cause output rotations of said elevation and heading gyros.

7. Apparatus as claimed in claim 6 in which the adapting means for the roll gyro includes signal-integrating means responsive to the output signal of the roll gyro.

8. Apparatus as claimed in claim 6 in which the adapting means for the roll gyro includes the heading gyro and means adapting the output signal of the roll gyro to activate the torque generator associated with the heading gyro.

9. Apparatus as claimed in claim 6 in which the adapting means for the roll gyro includes the heading gyro and means adapting the output signal of the roll gyro to activate the torque generator associated with the heading gyro, and in which the adapting means for the heading and elevation gyros includes a signal-integrating means and amplifying means the gain of which is dependent on the airspeed.

References Cited in the file of this patent

UNITED STATES PATENTS

| | | |
|---|---|---|
| 1,900,709 | Henderson | Mar. 7, 1933 |
| 2,387,795 | Isserstedt | Oct. 30, 1945 |
| 2,415,430 | Frische et al. | Feb. 11, 1947 |
| 2,432,036 | Noxon | Dec. 2, 1947 |
| 2,448,564 | Wilkerson | Sept. 7, 1948 |
| 2,509,446 | Oplinger et al. | May 30, 1950 |
| 2,586,034 | Halpert | Feb. 19, 1952 |
| 2,586,817 | Harris | Feb. 26, 1952 |
| 2,617,615 | Von Eschen | Nov. 11, 1952 |
| 2,638,288 | Hanna | May 12, 1953 |
| 2,649,264 | Slater | Aug. 18, 1953 |
| 2,649,564 | Meredith | Aug. 18, 1953 |

OTHER REFERENCES

Smiths Controlled Flight System, Smiths Aircraft Instruments Ltd., London, England, publication SAI/EP 108, issued September 1948, 34 pages, 318–489.